Patented May 5, 1942

2,282,001

UNITED STATES PATENT OFFICE 2,282,001

COLOR-FORMING GELATIN COMPOUND

John Russell and Robert Eliot Stauffer, Rochester, N. Y., assignors to Eastman Kodak Company, Rochester, N. Y., a corporation of New Jersey No Drawing. Application September 12, 1940, Serial No. 356,502. In Great Britain September 13, 1939

9 Claims. (Cl. 260—117)

This invention relates to color photography and particularly to non-diffusing coupling components and dyes for incorporation in gelatin layers.

It is known that colored photographic images may be produced by using a developer which forms a colored compound on development, and that the colored compound thus formed is deposited adjacent to the silver grains of the silver image during the development. It is also known that a colored image may be formed by adding to certain developer solutions or by incorporating in the gelatino-silver-halide emulsion before or after exposure a compound which couples during development with the oxidation product of the developing agent and forms a coloring substance which is likewise deposited adjacent to the silver grains of the silver image during development. Such a compound, which is employed in conjunction with a developing agent for the silver and which couples with the oxidation product thereof during development, is referred to herein as a coupling component or coupler.

The present invention concerns new or improved color forming compounds and dyes which are non-diffusing in gelatin and also includes a new or improved color development process.

Gelatin contains an appreciable amount of reactive amino groups which exist partly as end groups of the polypeptide chains but mostly as the $\epsilon$-amino group of the lysine side chain. We have found it possible to cause these amino groups to react with organic bodies which either have initially the properties of substances which it is desired to add to the gelatin layers of the photographic film or which can subsequently be made to undergo further chemical reactions giving the desired characteristic groups. In this way the characteristic group being attached to the gelatin molecule is prevented completely from wandering. Such reactions can be carried out not only with gelatin itself but with gelatin hydrolyzed to a slight extent. The gelatin derivative with the desired characteristic group may be used directly as a medium in the photographic film or may be mixed in any desired proportion with unmodified gelatin.

Other proteins such as casein have active amino groups which can be caused to undergo similar reactions with the production of derivatives containing characteristic groups. Since some of these proteins are originally alcohol-soluble, or different to a greater or less extent in solubility properties from gelatin, these derivatives are of special interest for a variety of uses.

It is an object of the present invention to provide a method for producing novel coupling components for incorporation in photographic emulsions. A further object is to provide coupling components which are non-diffusing in gelatin and gelatino-silver halide emulsions. A still further object is to provide non-diffusing dye compounds for use in filter and anti-halation layers. Other objects will be apparent from the following description of our invention.

These objects are accomplished by reacting an acid halide of a color generating compound with gelatin or other protein capable of jelling so that the final product is capable of jelling. This product does not diffuse from gelatin layers in which it is incorporated and the tendency to crystallize of couplers and dye compounds formed in this way is reduced.

We have found that if the gelatin with which the acid halide is reacted has been treated, or is treated during the reaction with the acid halide, so drastically that its jelling properties are destroyed, the resulting product diffuses from gelatin layers in which it is incorporated and the purpose of reaction with the gelatin is thereby defeated. It is important, therefore, that the final product produced by reaction of the acid halide with the gelatin or other protein is one which is capable of forming a jell.

The groups with which we have found that the active amine of the gelatine may be caused to react are organic acid halides such as benzoyl chloride, substituted benzoyl chlorides, benzene sulfonyl chloride, and substituted benzene sulfonyl chlorides. In the case of coupling components the compounds reacted with the gelatin may contain a coupling function as hereinafter defined, before reaction with the gelatin or such coupling function may be introduced after reaction with the gelatin. The reaction of the organic acid halides with the gelatin may proceed at alkalinities ranging from pH 7 to pH 12. The alkalinity of the reaction mixture can be regulated with an alkaline material such as an alkali metal hydroxide, e. g., sodium hydroxide, alkali carbonates, e. g., sodium carbonate, alkaline earth oxide or carbonate, or organic base.

The gelatin or other protein is treated with the organic acid halide under such conditions that the product is capable of jelling. Drastic treatment with glacial acetic acid, for example, would destroy the jelling properties of the protein and would not produce a product capable of jelling and being retained in a gelatin layer. The conditions of treatment such as the time of reaction, the pH and the temperature at which the reaction is carried out may all be controlled so that the gelatin is not appreciably degraded or broken down during the reaction with the organic acid halide. In general, the reaction temperature was maintained below about 35–40° C. and during the time of treatment at the pH's specified above the gelatin was found not to be degraded to such an extent that it's jelling properties are destroyed. A somewhat higher temperature may be used if the reaction time is shortened. We do not wish to be limited to a reaction temperature of not greater than 35–40° C. but this is a preferred temperature limit for carrying out the reactions according to our invention. The important point is that the product be capable of jelling or be in such undegraded form that it does not diffuse from a gelatin layer. We have found that the products which we can use still have the X-ray crystal diagram characteristic of a high molecular body thus indicating that the gelatin or other protein has not been appreciably broken down.

The general reaction scheme used to form coupling components or dyes according to our invention may be described as follows:

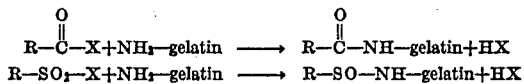

where
R=an aromatic radical
X=a halogen atom, e. g., chlorine

The introduction of organic groups of such nature as to modify the lyotropic properties of gelatin in such a way as to modify the setting point of gelatin sols or the introduction of lyophobic groups which would prevent the product from being compatible with ordinary gelatin is also possible. Such groups might be large organic groups or derivatives of long chain fatty acids such as stearyl or palmityl groups.

Where we refer to "color generating compound" we mean an aromatic compound capable of producing a dye by coupling as with the oxidation product of a primary aromatic amino developing agent to form dyes of the azomethine or indophenol type or with an azo coupling component to form dyes of the azo dye type.

Where the compounds are those which combine with the oxidation product of a primary aromatic amino developing agent to form a dye of the azomethine or indophenol type, they must contain a coupling function. By "coupling function" we mean a functional or reactive group common to coupler compounds which react with primary aromatic amino developing agents. This reactive group takes the form of a reactive methylene or reactive ethenol group. By "reactive methylene" we mean a $CH_2$ group which is reactive in the coupling process. The $CH_2$ group is usually present between two negative centers as in the groups $-CO-CH_2-CO-$ or $-CO-CH_2-CN$. By "reactive ethenol" we mean the group $$=C=C-$$
$$\phantom{==}|$$
$$\phantom{==}OH$$

This group occurs in the phenolic and naphtholic coupler compounds which are presumably active in the ortho or para position with respect to the position of the hydroxyl group.

The following examples, which are illustrative only, describe methods of forming the coupling and dye-generating compounds according to our invention:

Example 1

10 grams of gelatin in 100 cc. of water were adjusted to a pH of 10 to 11 with a 20% solution of potassium carbonate. To this there were added 1.7 grams of p-benzoyl acetaminobenzene sulfonyl chloride, dissolved in benzene, with rapid stirring. After 3½ hours at 25° C., the reaction product was acidulated with acetic acid and precipitated with methanol. The product was washed free of ash with cold water.

A 50–50 mixture of ethylene chlorhydrin and water was also found suitable as a dispersing agent for the gelatin compound.

Example 2

25 grams of gelatin in 250 cc. of water were adjusted to a pH of 10 to 11 with a 20% potassium carbonate solution and 0.5 grams of p-benzoyl acetaminobenzene sulfonyl chloride dissolved in ligroin was added with rapid stirring. The reaction was carried out at 30° C. for four hours after which the mixture was brought to a pH of 6 or less with acetic acid and deashed by electro dialysis. The product could be dispersed completely in the water in the same manner as ordinary gelatin and was capable of incorporation in a silver halide emulsion either alone or after dilution with ordinary gelatin.

Example 3

100 grams of gelatin were dissolved in 850 cc. of water and 50 cc. of 20% potassium carbonate were added. To this 5 grams of p-benzoylacetaminobenzene sulfonyl chloride dissolved in 200 cc. of hot isopropyl alcohol were added slowly with good stirring. The reaction was conducted at 30° C. for three hours after which the gelatin derivative was chilled overnight, sliced and washed for 72 hours in ice cold water. The product was dried and incorporated in a photographic emulsion by preparing a 6% solution in water at 40° C. and adding this with stirring to an equal volume of melted gelatino silver halide emulsion. The resulting mixture was coated on glass slides, dried and exposed and was developed in a p-phenylenediamine developer. A yellow dye was formed.

Example 4

80 grams of deashed gelatin having a viscosity of about 7 centipoises in a solution containing 7 grams of bone dry gelatin per 100 cc. of solution were melted in 700 cc. of distilled water. The gelatin sol thus produced was adjusted to pH 10.5 by the addition of a sufficient quantity of 20% potassium carbonate. There was then added slowly and with rapid and complete stirring at 30° C. 12 grams of 1-carbethoxy-5-naphthalene sulfonyl chloride dissolved in 25 cc. of warm isopropyl alcohol. The reaction was allowed to proceed for three hours and the product was chilled overnight and the jelly then sliced and washed for 72 hours in cold water (5°–15° C.). The washed gelatin was then dried in the manner usual in the product of photographic gelatins.

The reaction resulted in the formation of 1-hydroxy-5-naphthalenesulfonyl gelatin according to the following formula:

The 1-hydroxy-5-naphthalene sulfonyl gelatin thus produced was used to prepare a 6% sol in water. This sol was thoroughly mixed with an equal volume of gelatino silver halide emulsion and coated on chilled glass plates. These plates, after drying, were exposed to light in a photographic sensitometer and were processed by development in the following solution:

| | |
|---|---|
| p-Aminodiethylaniline | grams 2 |
| Sodium carbonate anhydrous | do 35 |
| Sodium sulfite | do 10 |
| Potassium bromide | gram 1 |
| Water to | liter 1 |

Development proceeded at 68° F. for 5–10 minutes after which the plates were washed, fixed and again washed. The silver image was then bleached by the use of a ferricyanide and hypo bleach bath after which they are again washed and dried. A cyan dye of good absorption characteristics was produced.

*Example 5*

In a similar manner a magenta dye was also produced by the reaction of 2-cyanoacetylnaphthalene-x-sulfonyl chloride with gelatin and development in a primary aromatic amino developer.

*Example 6*

A yellow dyed gelatin was produced by dissolving 200 grams of gelatin in 2 liters of water, adding 6 grams of potassium carbonate dissolved in a minimum quantity of water and then 14 grams of salicylylchloride. The salicylyl chloride was added with stirring at 30° C. and the reaction was allowed to proceed for two hours after which all carbon dioxide evolution has apparently ceased and the material was chilled overnight. The jelly was sliced and washed 72 hours with ice cold distilled water. The product was dried in the usual manner and was found to resemble the original gelatin closely in its swelling and solubility behavior in water.

The salicylyl gelatin thus produced was coupled with p-diazobenzene sulfonic acid to form a yellow dye. It might also be coupled with the oxidation product of a p-phenylenediamine developer.

*Example 7*

100 grams of photographic gelatin in 500 cc. of water were raised to a pH of 9.5 with potassium carbonate and to this there were added at 30° C. 12 grams of 1-methyl-2-nitro-4-benzenesulfonyl-chloride. The reaction time allowed was four hours. The resulting compound was washed and dried and was then treated with the theoretical quantity of sodium hydrosulfite to reduce it to 1-methyl-2-amino-4-benzene sulfonyl gelatin. This was washed and diazotized in a suitable diazotizing bath of sodium nitrite and hydrochloric acid.

This diazotized product could be coupled with agents such as α-naphthol, histamine and m-phenylene diamine to produce non-wandering azo dyes. The reactions involved may be represented as follows:

*Example 8*

A gelatin sol made alkaline with a sufficient quantity of 20% potassium carbonate to raise the pH to 9 was reacted with $4.4 \times 10^{-4}$ equivalents of m-nitrobenzoyl chloride, dissolved in benzene, per gram of dry gelatin. The reaction mixture was thoroughly stirred for about three hours at 30° C. maintaining the pH at 9 by additions of potassium carbonate solution. The products were acidulated to about pH 4 and deashed by electro dialysis.

The m-aminobenzoyl gelatin produced in this way was diazotized in the usual manner and coupled with the necessary quantity of m-phenylenediamine. This product was rediazotized and coupled with aniline. The resulting gelatin was a dark brownish red.

The primary aromatic amino developing agents used to develop the gelatin-coupler compounds made according to our invention are well known in color photography. They include the mono-, di- and triaminoaryl compounds and their derivatives formed by substitution in the amino group as well as in the ring. Suitable compounds are diethyl-p-phenylenediamine hydrochloride, monomethyl-p-phenylenediamine hydrochloride and dimethyl-p-phenylenediamine sulfate. The p-amino-phenols and their substitution products may also be used where the amino group is unsubstituted.

Among the advantages in our method of preparing colored photographic substances are freedom from wandering of the dye or in its own layer or from layer to layer of multi-layer coatings. Furthermore, the product resembles ordinary photographic gelatins in its general behavior with regard to swelling and solution in water. Difficulties of dispersion of the color-forming group in the photographic emulsion are, therefore, eliminated as well as difficulties due to aggregation and crystallization of the dye either in image layers or in anti-halation or filter layers.

It is to be understood that the examples included in the present specification are illustrative only and that our invention is limited only by the scope of the appended claims.

We claim:

1. The method of preparing a non-diffusing coupler capable of reacting with the development product of a primary aromatic amino developing agent on development of a silver halide image, which comprises reacting an acid halide of a coupler with a protein selected from the group consisting of gelatin and casein, at such temperature and for such time as to form a product of the protein and the acid halide capable of gelling.

2. The method of preparing a non-diffusing coupler capable of reacting with the development product of a primary aromatic amino developing agent on development of a silver halide image, which comprises reacting a carboxylic acid chlo-

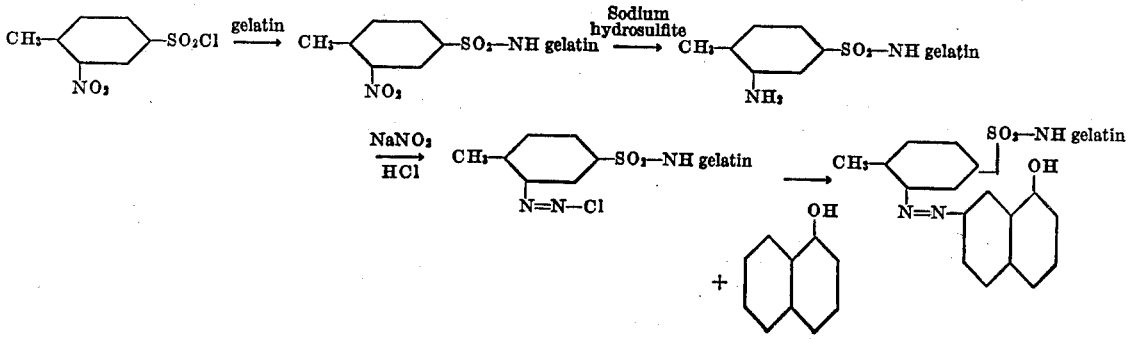

ride of a coupler with gelatin, at such temperature and for such time as to form a product of the gelatin and the acid halide of the coupler capable of gelling.

3. The method of preparing a non-diffusing coupler capable of reacting with the development product of a primary aromatic amino developing agent on development of a silver halide image, which comprises reacting a sulfonic acid chloride of a coupler with gelatin, at such temperature and for such time as to form a product of the gelatin and the acid halide of the coupler capable of gelling.

4. The method of preparing a non-diffusing coupler capable of reacting with the development product of a primary aromatic amino-developing agent on development of a silver halide image, which comprises reacting a sulfonic acid halide of a coupler with gelatin.

5. In the method of reacting an aromatic acid-halide with gelatin, the step which comprises maintaining the reaction temperature and time so low that the gelling properties of the gelatin are not destroyed.

6. In the method of reacting an aromatic carboxylic acid chloride with gelatin, the step which comprises maintaining the reaction temperature and time so low that the gelling properties of the gelatin are not destroyed.

7. In the method of reacting an aromatic sulfonic acid chloride with gelatin, the step which comprises maintaining the reaction temperature and time so low that the gelling properties of the gelatin are not destroyed.

8. The method of preparing a non-diffusing coupler capable of reacting with the development product of a primary aromatic amino developing agent on development of a silver halide image, which comprises reacting an aromatic acid chloride of a compound containing a group reactive with said development product with gelatin for about ½ to 4 hours and maintaining the reaction temperature below about 35° C. to produce a coupler capable of gelling.

9. The method of incorporating a non-diffusing azo dye in gelatin which comprises reacting an aromatic acid halide capable of being diazotized, with gelatin, at such temperature and for such time as to form a product capable of gelling, and diazotizing and coupling said product to produce an azo dye compound of gelatin which is non-diffusing in gelatin.

JOHN RUSSELL.
ROBERT ELIOT STAUFFER.